April 2, 1935.   M. M. SCULLY   1,996,553
BABY HISTORY INDICATOR AND RECORDER
Filed Feb. 6, 1932
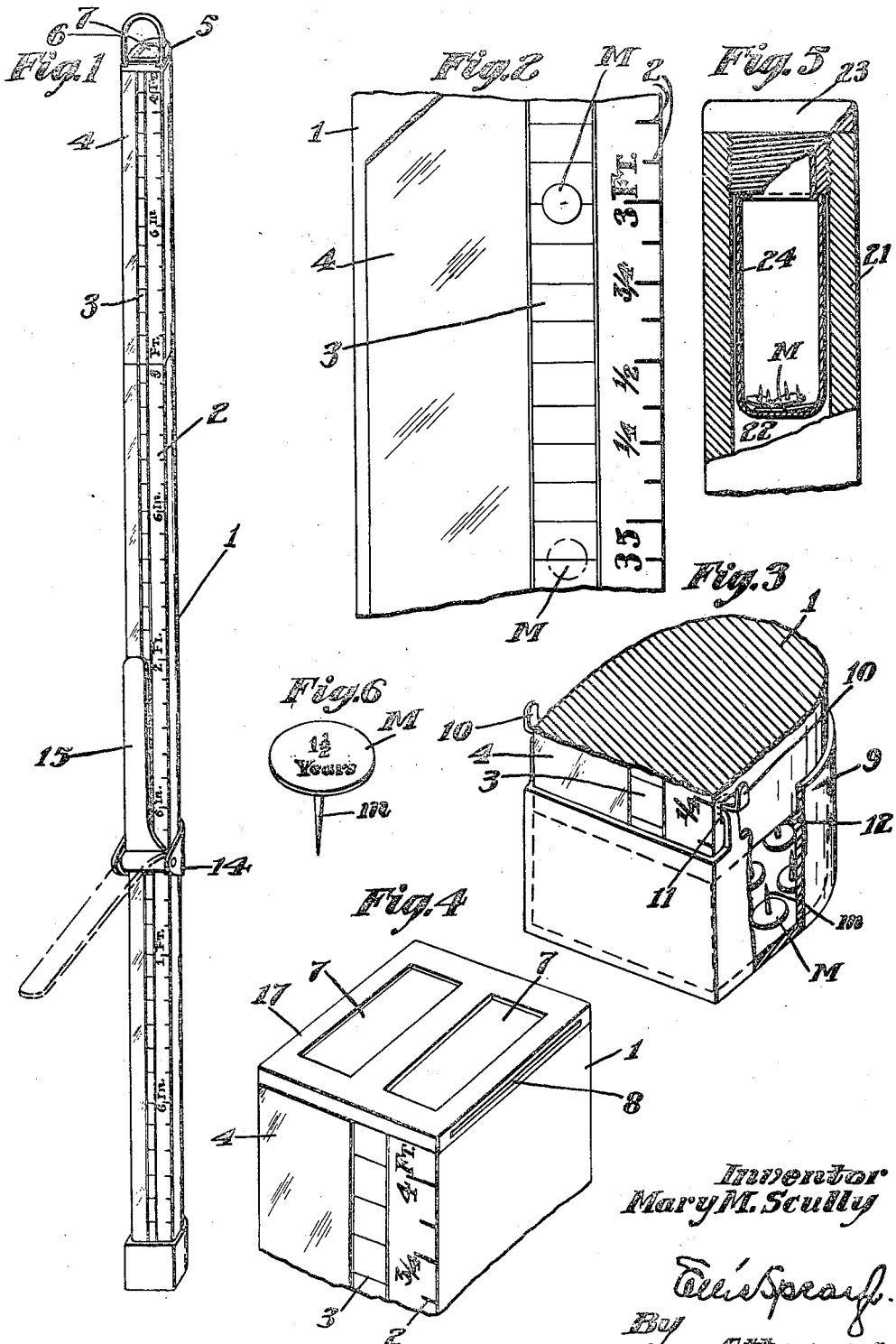

Patented Apr. 2, 1935

1,996,553

UNITED STATES PATENT OFFICE 1,996,553

BABY HISTORY INDICATOR AND RECORDER

Mary M. Scully, Cambridge, Mass.

Application February 6, 1932, Serial No. 591,370

4 Claims. (Cl. 116—1)

My present invention relates to the matter of ascertaining and recording the growth of children. In the proper rearing of a child it is well known that the observation of certain factors of growth are of great importance in order to be assured of normality, if such be the case, or to detect deficiencies if such occur.

My present invention contemplates a device for ascertaining and recording the growth of a child as one of these important factors. Children, and particularly the very young, are difficult to measure for height. It is particularly difficult to obtain accurate height measurements because at first of the inability and later sometimes the unwillingness of a child to cooperate in such a measurement. Very small children lack sufficient carriage or definite posture to make standing measurements possible, and older children are frequently either unwilling or resistant to anything that does not interest them. Parents also have constituted a problem in securing such records, but this has been largely because there has been provided no reasonably adapted means for making the measurement and getting a record. Ordinary hospital or office systems are not adapted to the home and the parents while willing, have generally neglected to get proper measurements and keep proper records.

My present invention contemplates the provision of simple devices which will make the matter of reasonably accurate measurement comparatively easy and at the same time provide for a permanent progressive record which will show growth from time to time at predetermined or indicated intervals.

The use of my invention throughout childhood will acquaint the child with the custom of taking and recording his measurements and will tend to arouse an interest instead of the frequent antagonism to such practice. In fact, my concept while involving simple devices provides for a basis of making such records in which the features are pleasurable, interesting and sufficiently easy to give the desired results. It is, of course, important that such records be made regularly and I therefore contemplate predetermined time and periods which may be made to coincide with fixed dates, such as birthdays, or fractions of the year. These and various other considerations as will later appear and be discussed are all involved and will be readily understood from the description of a characteristic device. Such I have illustrated in the accompanying drawing and to the drawing will make reference in the following specification. In the drawing:

Fig. 1 is a general elevation of a recording device in accordance with my invention.

Fig. 2 is an enlarged fragment of the same showing portions of record.

Fig. 3 a detail of the container end of such a device.

Fig. 4 a detail of a modified form illustrative of the many variants possible.

Fig. 5 a modified form of container end, and

Fig. 6 is an enlarged view of a member of the marker set.

My measuring device comprises a rigid rod or bar 1 of wood or other suitable material and of any desired cross section to form a longitudinal record face or faces. Such a face as shown in Fig. 2 may consist of a scale bearing portion 2, a marker receiving portion 3, and a data receiving portion 4. If desired, these may all be on one face of the rod as shown in Figs. 1 and 4, or, if preferred, the matter may be disposed on the several sides of the rod of Fig. 4.

The scale portion 2 may have any convenient disposition on the recording device 1 and may have any desired linear markings. As shown it bears an ordinary linear scale in feet and inches. The adjoining portion 3 if formed as a separate band may bear reference lines opposite the scale division. At any point along the portion 3 a marker or pronged member M may be affixed. These markers are provided in sets of predetermined periods of age so that there is provided a permanent age record of the child being measured. Once attached to the portion 3, these markers constitute with the scale a permanent record of the growth of the child and its height at the age appearing on the marker.

Adjoining the portion 2 is preferably the data receiving portion 4. On this may be indicated any pertinent statement explanatory or supplementary to the age and height records, for example, a notation of a previous sickness or other references explaining the lack of growth, or reference to a diet which may have stimulated growth, or like pertinent notations. If desired, this portion 4 may be covered with a celluloid strip set in and glued to the face of the stick and roughened to provide a writing surface.

The top 5 of the recording device is provided with a ring 6 for hanging it when not in use. This may be hinged to a name receiving cap 7 at the top of the stick. As shown in the rectangular form of Fig. 4, the cap 17 provides for two names which may be written on a card and inserted through the slot 8.

In the form shown in Fig. 1 the bottom of the member 1 is received by a marker container 9 provided with spring ears 10 which engage the bottom of the rod 1 which is indented as at 11 (Fig. 3).

There is provided near the top of the container 9 an inturned flange 12 on which the bottom of the stick bears, the stick acting as a top for the container so that the markers cannot be removed or lost. The markers M may be of any desired shape, but should include affixing means such as a penetrating portion adapted to be driven into the record face to hold the marker permanently in place.

The record as shown in Fig. 1 carries a slidable gage. This consists of a rod embracing clip 14 and a swinging arm 15 pivoted to it. When it is desired to measure the child, the arm 15 may be swung out horizontally from the rod and the clip 14 adjusted on the rod until the arm 15 touches the top of the child's head. When the measurement has been taken, the arm 15 may be snapped back into position flat against the face of the rod.

In simpler forms of my record device the gage is omitted and the level of the top of the head taken in any convenient way.

Also in simpler forms I recess the end of the member 1 as shown in Fig. 5. In this the upper end of the record bar 21 is bored out as at 22 and closed by a threaded plug 23. The plug 23 preferably is frictionally fitted with a receptacle 24 in which the markers M are safely held when taken out for the selection of the proper age or period marker. Usually a set of markers M include members having indicated ages as "½" year, "1" year, "1½" years, etc. Any form of fastener for the marker may be used, that shown being a sharp point $m$ like that of a tack. In fact, the markers M in very simple forms may be made with a flat disc-like head with point $m$ as shown in Fig. 6, or with prongs or screws (not shown).

Various modifications in the length and cross section of the rod and also in the several record receiving portions thereof, as well as in the shape and disposition of the container, and the means of securing the rod thereto may be resorted to without departing from the spirit of my invention if within the limits of the appended claims.

What I therefore claim and desire to secure by Letters Patent is:—

1. A device for recording the growth of children, comprising a measuring rod and a bottom member engaging the lower end of said rod, said rod bearing a linear scale and having a record portion adjacent said linear scale adapted to receive marker devices bearing suitable notations, said bottom member having a chamber for a set of marker devices, the bottom of said rod providing a cover for said chamber and being removable from said bottom member to permit access to said marker devices, said marker devices when removed from said chamber being positioned in said record portion to provide permanent records of measurement.

2. As an article of manufacture, a device for recording the growth of children, comprising a measuring rod and a bottom member adapted to receive the end of said rod, said bottom member having near its upper edge an inturned flange providing a bearing for said rod and below said flange having a chamber for marker devices, said rod while resting on said flange providing a top for said chamber.

3. As an article of manufacture, a device for recording the growth of children, comprising a measuring rod having indentations near the bottom thereof and a bottom member adapted to receive the end of said rod, spring members on said bottom member to enter said indentations to interlock the rod and bottom, said bottom member having near its upper edge an inturned flange providing a bearing for said rod and below said flange having a chamber for marker devices, said rod while resting on said flange providing a top for said chamber.

4. A device for recording the growth of children, comprising a measuring rod and a bottom member, said rod adjacent its end being indented and said bottom member having spring ears adapted to enter said indentations to hold said rod in said bottom member.

MARY M. SCULLY.